United States Patent

Ide et al.

[11] 3,979,954
[45] Sept. 14, 1976

[54] KARMAN VORTEX FLOWMETER

[75] Inventors: Hirofumi Ide, Tokyo; Tamotsu Kobayashi, Yokohama, both of Japan

[73] Assignee: Hokushin Electric Works, Ltd., Tokyo, Japan

[22] Filed: July 15, 1975

[21] Appl. No.: 596,016

[30] Foreign Application Priority Data
July 29, 1974  Japan .............................. 49-87148

[52] U.S. Cl. ............................................ 73/194 VS
[51] Int. Cl.² ............................................ G01F 1/32
[58] Field of Search .............. 73/194 A, 194 B, 195, 73/212, 194 VS

[56] References Cited
UNITED STATES PATENTS

| | | | |
|---|---|---|---|
| 2,552,017 | 5/1951 | Schwartz et al. | 73/204 |
| 3,564,912 | 2/1971 | Malone et al. | 73/194 |
| 3,581,565 | 6/1971 | Dieterich | 73/212 |
| 3,685,355 | 8/1972 | DeBaum | 73/212 |
| 3,719,080 | 3/1973 | Burgess | 73/194 |
| 3,775,673 | 11/1973 | Watanabe | 73/194 X |

FOREIGN PATENTS OR APPLICATIONS

| | | | |
|---|---|---|---|
| 1,914,335 | 3/1969 | Germany | 73/194 |

*Primary Examiner*—Herbert Goldstein

[57] ABSTRACT

A Karman vortex flowmeter in which the fluid to be metered is conducted through a flow tube having a relatively large diameter. A multiplicity of rod-like units are arranged in parallel relation across the tube to define an obstacle array. Each unit acts as a vortex shedder and is constituted by rod sections which are coupled together axially by flow-detecting probes. Each probe in the array is so located as to avoid mutual interaction with the other probes. The electrical signals derived from the probes are so weighted and averaged as to obtain an output giving the mean flow rate. Even when the flowmeter is installed in a flow line containing elbows and other profile-disturbing elements, precise flow measurement can be accomplished.

9 Claims, 7 Drawing Figures

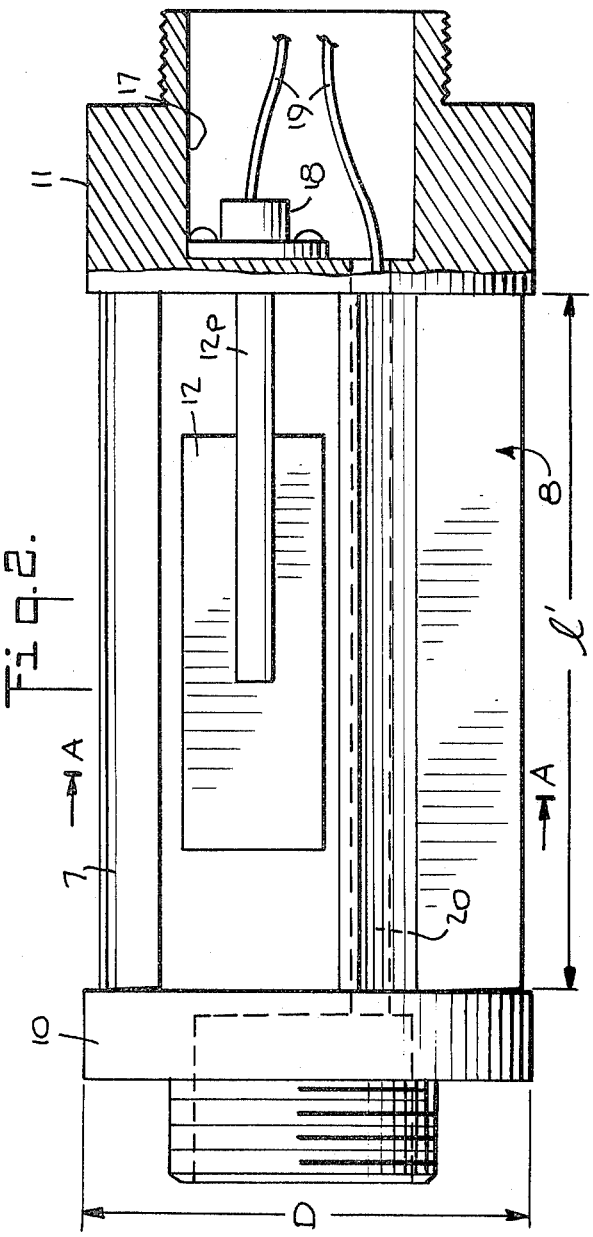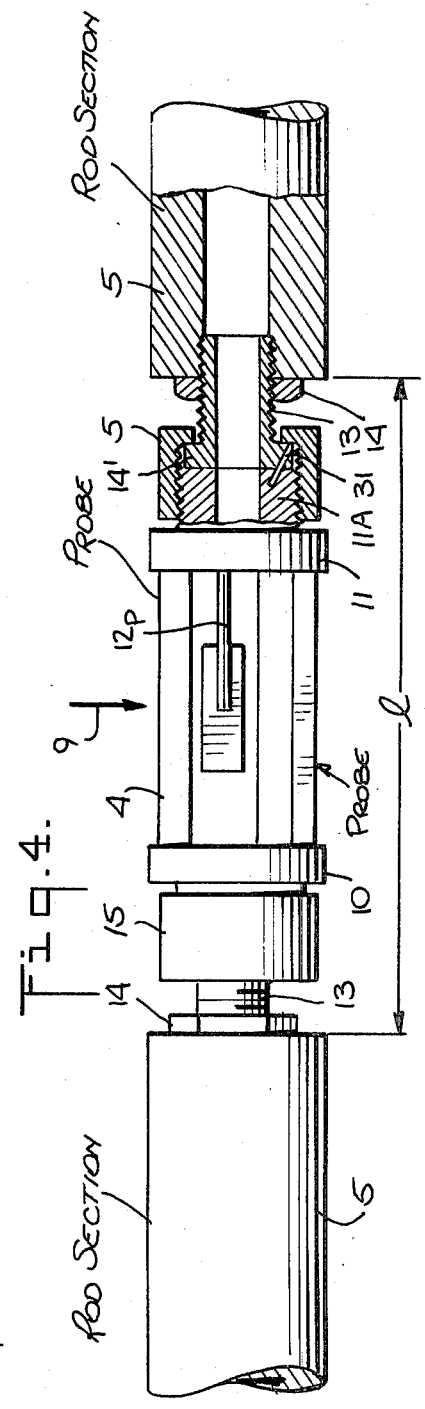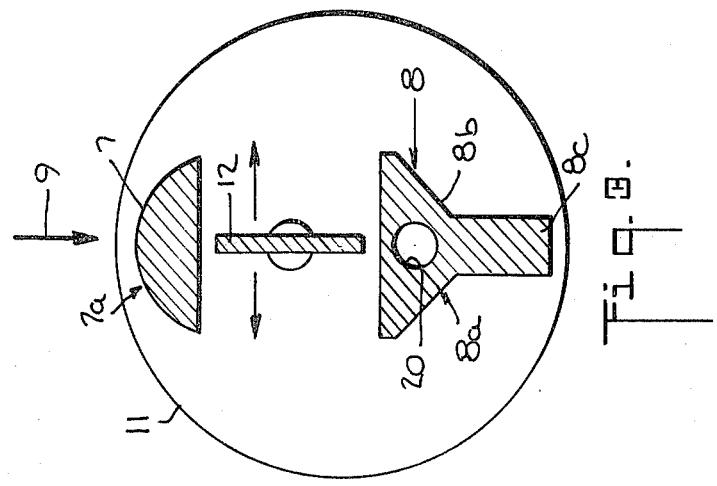

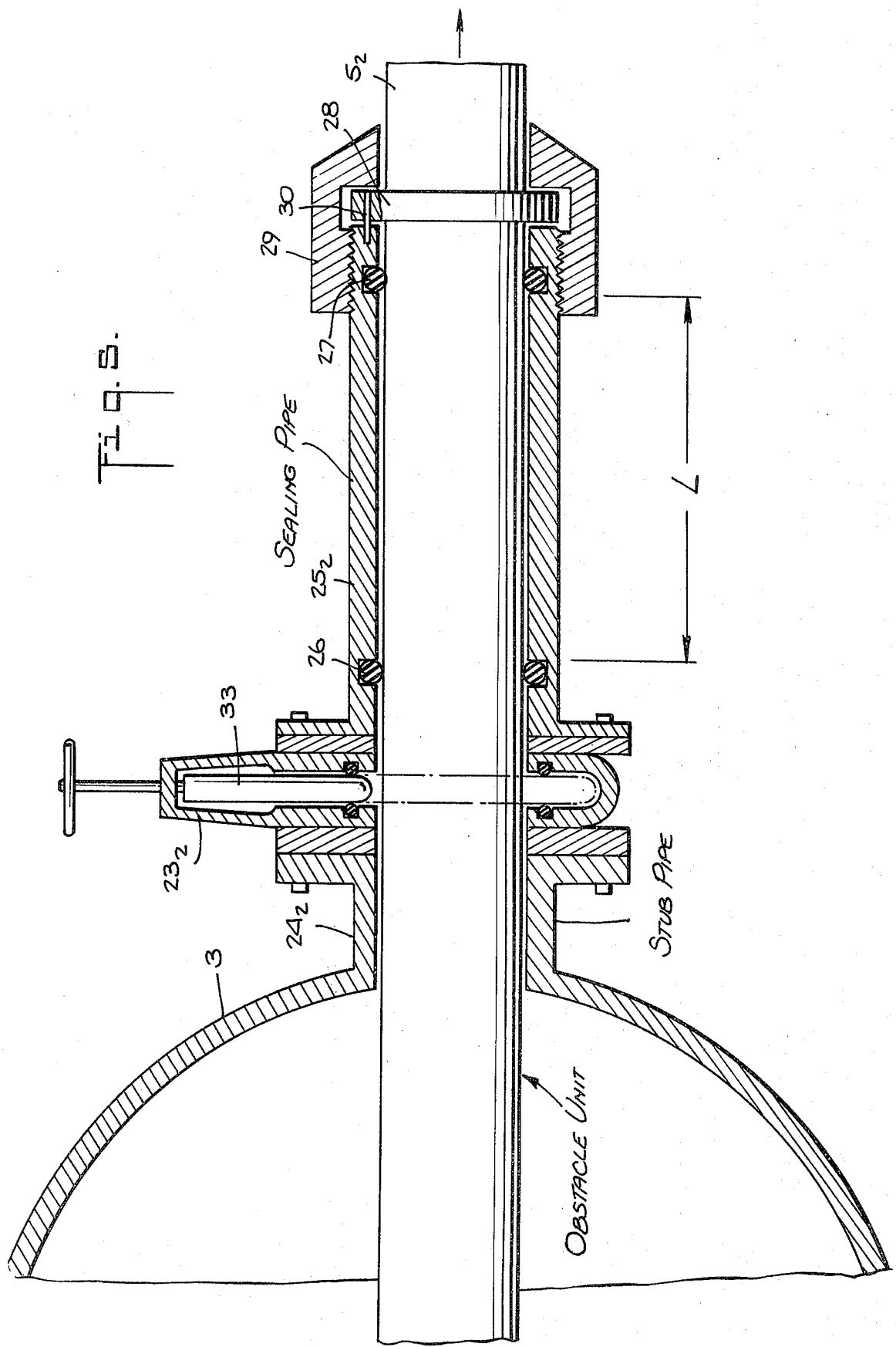

KARMAN VORTEX FLOWMETER

BACKGROUND OF THE INVENTION

This invention relates generally to flow measuring apparatus, and more particularly to a Karman vortex flowmeter having a relatively large diameter (i.e., greater than 250 m.m.).

It is well known that under certain circumstances the presence of a vortex shedder in a flow conduit will give rise to Karman vortices. The number of such vortices formed per unit of time, i.e., the frequency of Karman vortices, is a function of the flow velocity or flow rate of the fluid following through the conduit. Thus the flow rate can be determined by measuring the frequency of the Karman vortices.

A significant advantage of a Karman vortex flowmeter, apart from the fact that it is of simple construction, is that there exists an excellent proportional relationship between the frequency of the vortices and the velocity of flow, but only if the probe is ideally positioned and the flow velocity profile assumes an ideal form. In actual practice, however, the flow velocity in a cross-sectional plane in the flow tube does not assume an ideal profile wherein the fluid velocity is at its maximum value at the central axis of the tube and diminishes in value as one approaches the inner surface thereof.

For example, when the flowmeter is installed downstream directly adjacent an elbow in the flow line, the elbow acts to disturb considerably the velocity profile. Consequently, if the detected vortices are converted into a flow velocity reading on the basis of the ideal velocity profile condition, this conversion results in a substantial error.

In the case of flowmeters of large diameter installed in culverts, other problems arise that are dictated by the nature of the installation. The culvert is usually placed within an underground pit that is only accessible through a manhole. In an installation of this type, the probes of the flowmeter are subject to contamination from particulate matter carried by the fluid being metered and, in some instances, the probes become clogged with contaminants. But because of the confined pit space within which the flowmeter is installed, with existing types of flowmeters it is very difficult if not impossible to remove the contaminated probes for inspection, cleaning or replacement.

SUMMARY OF THE INVENTION

In view of the foregoing, it is the main object of the invention to provide a Karman vortex flowmeter in which a multiplicity of vortex-shedding rod-like units are mounted in parallel relation across a flow tube which is of relatively large diameter.

A salient feature of the invention resides in the fact that instead of a single vortex-shedding rod or obstacle operating in conjunction with a single sensor or probe, use is made of a plurality of probes in conjunction with multiple rods, the signals derived from the respective probes being so weighted and averaged as to determine the mean flow rate, whereby the flowmeter affords an accurate reading of flow rate and is substantially insensitive to disturbances in the flow velocity profile.

More particularly, it is an object of this invention to provide a flowmeter of the above-noted type in which the probes and rods are integrated to form rod-like units which are insertable into the flow tube and are readily removable therefrom, whereby the units may be withdrawn from the tube even within the narrow confines of an underground pit for purposes of inspection, maintenance and replacement.

Still another object of the invention is to provide a vortex-type flowmeter having insertable rod-like obstacle units which are hermetically sealed and may be removed from the flow tube without breaking the seal and without cutting the flow of fluid through the tube.

Briefly stated, in a flowmeter in accordance with the invention, the fluid to be metered is conducted through a flow tube having insertable therein a multiplicity of rod-like units to form an obstacle array across the tube in which the units are disposed in parallel relation. Each unit is constituted by a series of rod sections which are coupled together by probes, the coupling between the probes and the rod sections being effected by detachable couplers, whereby the probes may be disconnected from the rod sections in the course of withdrawing a unit from the tube.

OUTLINE OF DRAWING

For a better understanding of the invention as well as other objects and further features thereof, reference is made to the following detailed description to be read in conjunction with the accompanying drawings, wherein:

FIG. 2 is a front elevation view of one probe included in the array;

FIG. 3 is a transverse section taken in the plane indicated by line A—A in FIG. 2;

FIG. 4 illustrates the manner in which a probe is intercoupled to rod sections to form a unit;

FIG. 5 is a sectional view illustrating the manner of sealing a unit;

DESCRIPTION OF INVENTION

Figure 1:
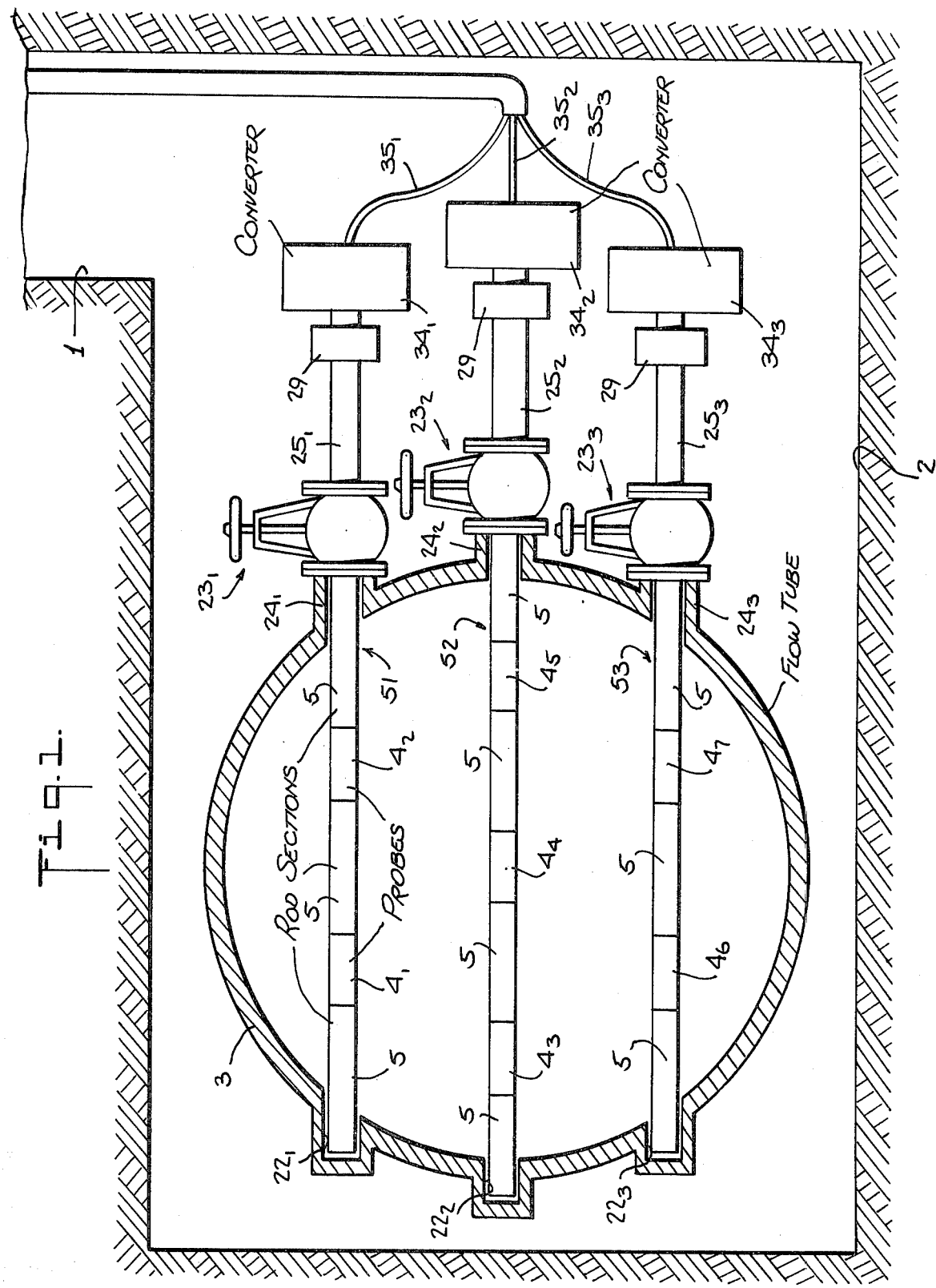
FIG. 1 is a cross-sectional view of a preferred embodiment of a vortex-type flowmeter having a multiple-unit obstacle array in accordance with the invention.

Referring now to FIG. 1 of the drawing, there is illustrated a manhole 1 which communicates with an underground chamber or pit 2 extending at right angles to the manhole. Disposed adjacent the side of the pit opposite to the manhole side thereof is a flow tube 3. Tube 3 has a circular cross-section of large diameter.

Extending across the tube is an obstacle array formed by a multiplicity of rod-like units $5_1$, $5_2$ and $5_3$ arranged in parallel relation. Unit $5_1$ is formed by three rod sections 5 intercoupled by two probes $4_3$, $4_4$ and $4_5$. Unit $5_3$ is formed by three rod sections 5 intercoupled by two probes $4_6$ and $4_7$.

The units are inserted in the tube to occupy positions lying in a transverse plane normal to the central axis of the tube. Units $5_1$, $5_2$ and $5_3$ are inserted into the tube through respective stub pipes 24, $24_2$ and $24_3$, projecting laterally from the side of tube 3 that is adjacent manhole 1. The units in the obstacle array are approximately equi-distant from each other.

The arrangement of probes $4_1$ to $4_7$ within the tube is such that the probes are uniformly distributed within the transverse plane normal to the central axis of the tube. Thus probe $4_4$ is located on the central axis, while the probes which surround probe $4_4$ are located at points 60° apart from each other on an inner circle which is concentric with tube 3, the diameter of the inner circle being about ⅔ of the tube diameter.

As shown in FIGS. 2 and 3, a probe 4 of this type is formed by a front section 7 and a rear section 8 parallel thereto to define a gap therebetween. The dimension of the gap is so determined that it is at least more than 1/5 of a total width equal to four times the width of front section 7, but is less than the total width.

The leading edge 7a of front section 7 is in the form of a smoothly-curved convex surface. Rear section 8 is provided with inclined sides 8a and 8b, defining a taper leading to a tail 8c extending downstream therefrom. Front section 7 and rear section 8 extend between and are secured to spaced blocks 10 and 11. A detector 12 is installed within the gap between sections 7 and 8, the detector serving to convert the periodic vortices to a corresponding electrical pulse signal. In the embodiment illustrated, the detector is a plate-type strain gauge which is disposed in a plane 9 parallel to the axis of flow. Detector 12 is cantilevered on block 11 by means of a post 12p.

The probes are so attached to rod sections 5 of each unit ($5_1$, $5_2$ and $5_3$) that the probes may be decoupled from the rod sections in the course of withdrawing the unit from the tube. In practice, these rod sections may be made by cutting a long pipe into several short sections.

As shown in FIG. 4, block 11 at one end of probe 4 is provided with an externally-threaded hub 11A. In order to couple this end of probe 4 with a rod section 5, a coupler 13 is provided in the form of an externally-threaded pipe, one end of which is threadably received within the internally-threaded end of rod section 5, thereby coaxially connecting the coupler to this section. This connection is fixed by means of a nut 14.

The other end of coupler 13 has an enlarged flange 14' formed thereon whose diameter matches the diameter of block hub 11A. An internally-threaded cap nut 15 on coupler 13 engages the external-threading on flange 14' and on hub 11A, thereby effecting a coaxial connection between block 11 and coupler 13. Block 10 at the other end of probe 4 is coupled to another rod section 5 in the same manner by means of a coupler 13, a nut 14 and a cap nut 15. Thus units $5_1$, $5_2$ and $5_3$ are constituted by axially-aligned, alternately-positioned, intercoupled probes and rod sections.

Referring now to FIG. 2, it will be seen that a terminal 18 is disposed within a cavity 17 in block 11 and that a lead wire 19 is connected to this terminal. Lead wire 19 passes through coupler 13 and the rod section 5 associated therewith and goes outside of the flow tube on the manhole side thereof. Lead wires, such as lead wire 19', coming from the other probes in the unit extend through bores 20 in the rear section 8 thereof. Thus all wires from the probes are enclosed within the unit and are thereby isolated from the fluid.

As shown in FIG. 1, in order to receive the free ends of units $5_1$, $5_2$ and $5_3$ inserted within tube 3, hollow sockets 22, $22_2$ and $22_3$ are formed on the periphery of tube 3 at positions which are in alignment with stub pipes $24_1$, $24_2$ and $24_3$, respectively, through which the units are inserted in the tube. When removing the units, they are withdrawn from the tube in the so-called hot-tap condition; that is, without stopping fluid flow through tube 3. This withdrawal is carried out through valves $23_1$, $23_2$ and $23_3$ mounted on stub pipes $24_1$, $24_2$ and $24_3$, respectively.

Valves $23_1$ to $23_3$ are flange-mounted on stub pipes $24_1$ to $24_3$. Flange-mounted on the other side of these valves are sealing pipes $25_1$, $25_2$ and $25_3$, one for each unit. As illustrated in FIG. 5, unit $5_2$, which is representative of all of the units, is inserted within tube 3 through sealing pipe $25_2$ and valve $23_2$. Two O-rings 26 and 27 received within annular grooves on the inner wall of sealing pipe $25_2$ adjacent the ends thereof engage the surface of unit $25_2$ and thereby prevent leakage from flow tube 3.

The distance "L" between O-rings 26 and 27 on the sealing pipe is greater than the distance 1 in FIG. 4 between the ends of the rod sections 5 which are intercoupled by a probe 4. Consequently, since at least one of these rod sections will necessarily make contact with one of O-rings 26 and 27, hermetic sealing between the interior and exterior of flow tube 3 is maintained, even when a unit is being withdrawn from the tube.

When unit $5_2$ is fully inserted in flow tube 3 through sealing pipe $25_2$ and valve $23_2$, a flange 28 formed adjacent the end of the unit is compressed against the end face of sealing pipe $25_2$ and fixed to it by a cap nut 29 whose internal threading engages the external threading on the end of sealing pipe $25_2$. To prevent rotational movement of the unit, a pin 30 is inserted in a small bore in the end of sealing pipe $25_2$, the pin passing through unit flange 28. Moreover, as shown in FIG. 4, a pin 31 going through flange 14' is received in a small bore in hub 11A of the probe block 11. This pin acts to prevent rotation of the probe, and thereby maintains the face of front section 7 upstream.

In FIG. 5, when unit $5_2$ is withdrawn from flow tube 3 and the last rod section 5 of the unit projects outside of sealing pipe 25, the stem 33 in valve $23_2$ is shifted in the downward direction by the valve wheel, thereby shutting the valve before the last rod section is fully withdrawn. To facilitate this operation, the last rod section of each unit is provided with a mark which is visible to the observer to indicate the need to shut the valve.

The various leads from the probes incorporated in units $25_1$, $25_2$ and $25_3$ pass into respective converters $34_1$, $34_2$ and $34_3$, which, as shown in FIG. 1, are mounted at the ends of the unit. These converters convert the probe signals into signals appropriate for transmission, the converter outputs being fed to an indicating station outside of manhole 1 through suitable cables 35, $35_2$ and $35_3$.

Figure 6:
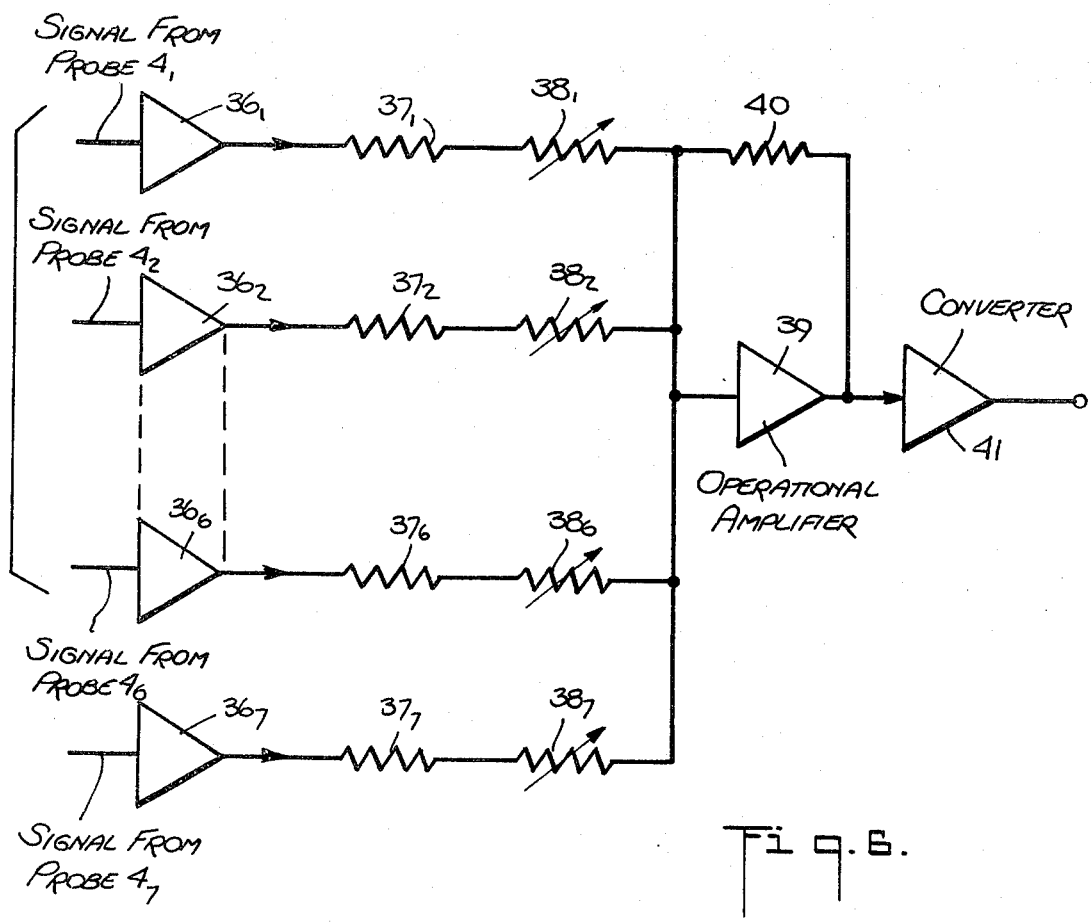
FIG. 6 is a schematic diagram of a circuit for combining the signals derived from the probes of the flowmeter to produce a composite output signal.

As shown in FIG. 6, the pulse signals derived from probes $4_1$ and $4_2$ (unit $5_1$), probes $4_3$, $4_4$ and $4_5$ (unit $5_2$) and probes $4_6$ and $4_7$ (unit $5_3$) are applied to respective voltage converters $36_1$ to $36_7$. The output of voltage converter $36_1$ is fed through a fixed resistor $37_1$ in series with a variable resistor $38_1$ to the input of an operational amplifier 39. Added to this input are the outputs of voltage converters $36_2$ to $36_7$. Each of these outputs is fed to operational amplifier 39 through a fixed resistor ($37_2$ to $37_7$) in series with a variable resistor ($38_2$ to $38_7$). A feedback resistor 40 is connected between the output and input of operational amplifier 39.

Thus the signals from the probes, whose frequency represents the periodicity of the vortices detected thereby, are converted by converters $36_1$ to $36_7$ to analog signals. These analog signals are weighted by variable resistors $38_1$ to $38_7$ in a manner corresponding to the flow velocity profile in flow tube 3. If necessary, the behavior errors resulting from differences in the characteristics of the various probes in the assembly may be compensated for. The outputs of converters $36_1$ to $36_7$ are summed in amplifier 39 and converted into a current signal suitable for transmission by means of a converter 41 coupled to the output of the amplifier.

By way of example, the detected signal from probe $4_4$ placed at the center of flow tube 3 and fed to converter $36_4$, is weighted 50%. On the basis of this weighted output, the outputs from the other probes are weighted to correspond to the existing velocity profile, utilizing the variable resistors for this purpose. Converter 41 is also used to adjust the full scale of the system.

Figure 7:
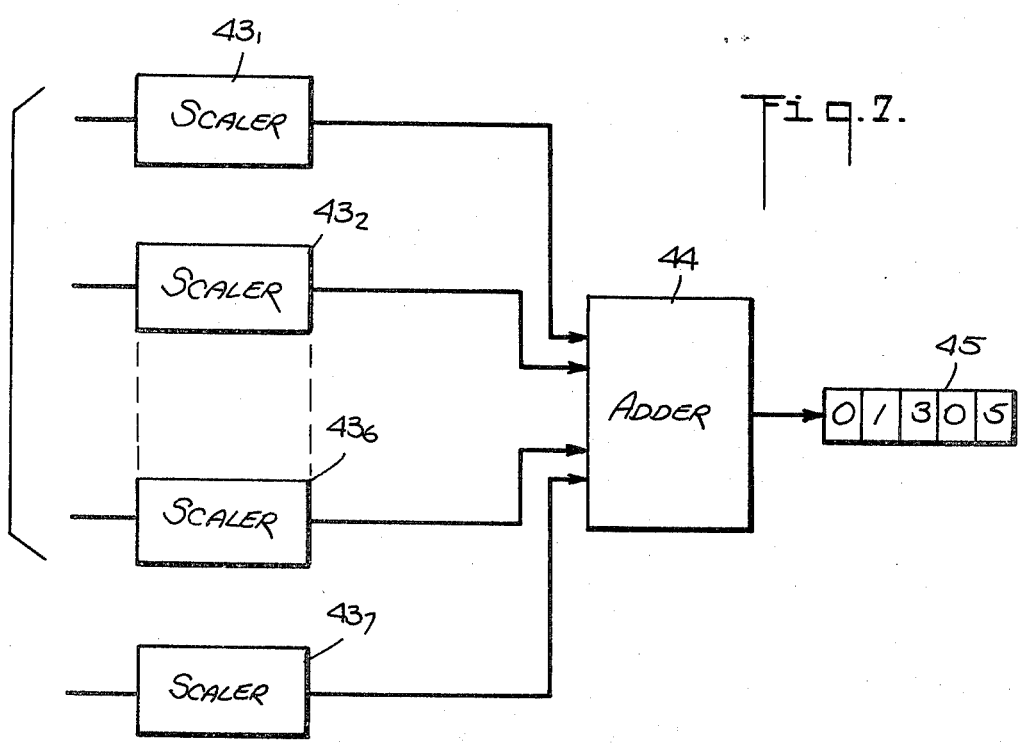
FIG. 7 is a block diagram of another embodiment of a probe signal output circuit.

Referring now to FIG. 7, there is shown another embodiment of a signal output circuit. In this instance, scalers $43_1$ to $43_7$ are used in place of the frequency-to-voltage converters $36_1$ to $36_7$ and the variable resistors $38_1$ to $38_7$ in FIG. 6. In these scalers, behavior errors resulting from different probe characteristics are compensated for, and the input pulse signals derived from the several probes $4_1$ to $4_7$ are weighted to correspond to the flow velocity profile.

The output of scalers $43_1$ to $43_7$ are applied to a common adder circuit 44 which acts to sum the scaler outputs and the output obtained from adder circuit 44 is processed in a manner such that one pulse corresponds to a fixed volumetric flow rate such as 100 l. The output of adder circuit 44 is fed to a digital indicator 45 to provide a flow rate reading.

As noted previously, a Karman vortex flowmeter having a multiplicity of probes in accordance with the invention makes possible highly accurate flow measurement without regard to disturbances in the flow velocity profile. With a conventional vortex flowmeter using a single probe, the measurement error can be made less than 1%, but only when the velocity profile approaches the ideal condition. When, however, this profile is disturbed, it is difficult to achieve the same high order of accuracy. But with the present invention, the measurement error can be made less than 1% even when a considerable disturbance in velocity profile is experienced.

It will be evident from the foregoing, that a Karman vortex flowmeter in accordance with the invention has the following advantageous features:

A. Since each unit is formed by rod sections intercoupled to probes, which unit is inserted into the flow tube through one side thereof, the insertion and removal of the unit may be effected within a confined space, such as an underground pit.

B. By using probes of the type shown in FIGS. 2 and 3 in the array of units, mutual interaction of the vortices can be avoided without the need for partition walls in the tube. When, for example, the longitudinal length $l'$ of the probe is made longer than three of four times the distance D (see FIG. 2) between the front section 7 and rear section 8 of the probe, within these limits the undesirable influence of the rod sections does not appear in the vortices generated by the probe, and larger and more stabilized vortices may be obtained. Moreover, since partition walls can be omitted, the arrangement may be such as to permit insertion of the units into the tube in one direction.

C. Since each unit is formed by intercoupled rod sections and probes, it becomes possible to replace individual probes of the unit in a confined space.

D. Since sealing pipes and valves serve to maintain a hermetic seal, each unit may be withdrawn in the so-called hot-tap condition without arresting flow in the tube.

Although in the embodiment shown in FIG. 1, seven probes are uniformly disposed in the tube, the invention is not necessarily limited to such an arrangement. For instance, four probes can be installed in the tube at points 90° apart on a concentric circle whose diameter is about ⅔ that of the tube diameter. Further, it may be possible to omit probe $4_4$ located on the central axis in the flow tube's cross-sectional plane in FIG. 1, and, in lieu thereof, arrange four additional probes at points 90° apart on a concentric circle whose diameter is about ½ of the tube diameter. The distribution of these probes may be changed in various ways.

In the embodiment disclosed herein, rod sections 5 and probes 4 are coupled together in the same manner as union joints employed in conjunction with plumbing parts. These joints must be constructed so as not to undesirably influence the probes. Preferably, therefore, the couplers 13 should be welded to rod sections 5, thereby omitting nut 14.

Although in the embodiment disclosed herein, a probe of the type shown in FIGS. 2 and 3 is utilized, other types of probes may be used in lieu thereof. For example, a single rod type probe having a circular cross-section, a single rod type probe having a rectangular cross-section, or a single rod type probe having a triangular cross-section may be used in conjunction with the rod sections. Instead of strain gauge detector 12, a thermo-electric detecting means or thermistor may be used in the probe. Although, in the embodiment shown in FIG. 1, each unit includes at least two probes, it may be possible to use units having a single probe. Further, it may be possible to omit units $5_1$ and $5_3$.

While there have been shown and described preferred embodiments in accordance with the invention, it will be appreciated that many changes and modifications may be made therein without, however, departing from the essential spirit thereof.

We claim:

1. A Karman vortex flowmeter comprising:
    A. a flow tube having a relatively large diameter through which is flowable a fluid to be metered, said tube being installable in a flow line whose structure is such as to give rise to considerable disturbances in the velocity profile of the fluid to be metered;
    B. a multiplicity of rod-like vortex shedding units disposed within the tube in a parallel array lying in a transverse plane normal to the flow axis, each unit generating Karman vortices;
    C. probes associated with each unit to detect the vortices produced thereby, each probe providing an electrical signal whose frequency depends on the periodicity of said vortices, each unit being formed by a series of rod sections which are intercoupled with the probes associated therewith, the probes being coaxially aligned with the sections; and
    D. a signal output circuit coupled to the probes of the units and combining the signals thereof to produce an output signal that is substantially proportional to the flow rate of said fluid and is substantially insensitive to said disturbances in the velocity profile.

2. A flowmeter as set forth in claim 1, wherein said output circuit includes means to impart weight to the signals from the respective probes in a manner corresponding to the flow velocity profile of said fluid in said plane and to average the weighted signals to obtain the mean flow rate.

3. A flowmeter as set forth in claim 1, wherein said probes are coupled to said sections by detachable couplers.

4. A flowmeter as set forth in claim 1, wherein said units are insertable in said tube through stub pipes projecting laterally from one side thereof.

5. A flowmeter as set forth in claim 4, wherein the free ends of said units are received within sockets projecting laterally from the other side of the tube in alignment with said stub pipes.

6. A flowmeter as set forth in claim 4, wherein each of said stub pipes has a valve attached thereto, and each valve has a sealing pipe extending therefrom in axial alignment with the stub pipe, each of said units being insertable into said tube through said sealing pipe, said valve and said stub pipe.

7. A flowmeter as set forth in claim 6, wherein said sealing pipe is provided adjacent either end thereof with internal O-rings which engage the surface of the inserted unit.

8. A flowmeter as set forth in claim 1, wherein each probe is constituted by a pair of spaced blocks which are bridged by a front section and a rear section in parallel relation to define a gap, a plate disposed in said gap and cantilevered from one of said blocks and a detector mounted on said plate.

9. A flowmeter as set forth in claim 8, wherein said detector is a strain gauge.

* * * * *